(12) United States Patent
    Chen

(10) Patent No.: US 11,092,483 B2
(45) Date of Patent: Aug. 17, 2021

(54) LIGHT SENSOR WITH HIGH LINEARITY COMPRISING A PHOTOELECTRIC COMPONENT ELECTRICALLY CONNECTED WITH AN ERROR AMPLIFIER, A COMPARATOR AND A COUNTER CIRCUIT

(71) Applicant: ANPEC ELECTRONICS CORPORATION, Hsinchu (TW)

(72) Inventor: Chih-Ning Chen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 25 days.

(21) Appl. No.: 16/785,719

(22) Filed: Feb. 10, 2020

(65) Prior Publication Data
    US 2021/0131866 A1    May 6, 2021

(30) Foreign Application Priority Data
    Nov. 4, 2019 (TW) ................................. 108139963

(51) Int. Cl.
    *G01J 1/46* (2006.01)
(52) U.S. Cl.
    CPC ....................... *G01J 1/46* (2013.01)

(58) Field of Classification Search
    CPC .. H04N 5/23241; H04N 5/335; H04N 5/3698; H01L 27/14636; G01J 1/44; G01J 1/46
    USPC ............................................... 250/214 R, 205
    See application file for complete search history.

(56) References Cited

U.S. PATENT DOCUMENTS 9,627,011 B1* 4/2017 Conte ....................... G11C 7/12

\* cited by examiner

*Primary Examiner* — Que Tan Le
(74) *Attorney, Agent, or Firm* — Li & Cai Intellectual Property (USA) Office

(57) ABSTRACT

A light sensor with high linearity is provided. A photoelectric component converts light energy into a photocurrent to a first capacitor. An error amplifier has a first amplification input terminal and a second amplification input terminal, which are respectively connected to a reference voltage source and a first terminal of a first transistor. A first terminal of a second transistor is connected to the second amplification input terminal. A second terminal of the first transistor is connected to the first capacitor. An output terminal of the error amplifier is connected to a second terminal of the second transistor. A first comparator compares a voltage of the first capacitor with a lowest one of a modulated voltage and a reference voltage to generate a first comparing signal. A counter circuit performs counting according to the first comparing signal.

10 Claims, 7 Drawing Sheets

LIGHT SENSOR WITH HIGH LINEARITY COMPRISING A PHOTOELECTRIC COMPONENT ELECTRICALLY CONNECTED WITH AN ERROR AMPLIFIER, A COMPARATOR AND A COUNTER CIRCUIT

CROSS-REFERENCE TO RELATED PATENT APPLICATION

This application claims the benefit of priority to Taiwan Patent Application No. 108139963, filed on Nov. 4, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light sensor, and more particularly to a light sensor with high linearity.

BACKGROUND OF THE DISCLOSURE

Cell phones having a touch screen are becoming more and more popular. When a user makes a call, a face of the user may easily touch the touch screen of the cell phone to inadvertently trigger the cell phone to perform an operation. Therefore, an optical proximity sensor is often installed in the cell phone. When the optical proximity sensor detects that light is blocked, a system of the cell phone determines that the face is too close to the touch screen, and thus the touch screen is turned off, thereby preventing the cell phone from being triggered unexpectedly by being touched with the face, and saving a power of the cell phone during the call.

SUMMARY OF THE DISCLOSURE

In response to the above-referenced technical inadequacies, the present disclosure provides a light sensor with high linearity. The photoelectric component is connected to a first capacitor and configured to convert light energy illuminating through the photoelectric component into a photocurrent to the first capacitor. The error amplifier has a first amplification input terminal and a second amplification input terminal, which are respectively connected to a reference voltage source and a first terminal of a first transistor. A first terminal of a second transistor is connected to the second amplification input terminal. A second terminal of the first transistor is connected to the first capacitor. An output terminal of the error amplifier is connected to a second terminal of the second transistor. The first comparator has a first comparison input terminal and a second comparison input terminal, which are respectively connected to the first capacitor and the output terminal of the error amplifier. The first comparator is configured to compare a voltage of the first capacitor with a first modulated voltage of the second comparison input terminal to generate a first comparing signal. The sample and hold circuit is connected to a control terminal of the first transistor, a control terminal of the second transistor and an output terminal of the first comparator. The sample and hold circuit is configured to control the first transistor and the second transistor according to the first comparing signal. The counter circuit is connected to the output terminal of the first comparator and configured to count according to the first comparing signal.

In certain embodiments, the first comparator further includes a third comparison input terminal connected to the reference voltage source. The first comparator is configured to compare the voltage of the first capacitor with a lowest one of the first modulated voltage of the second comparison input terminal and a reference voltage of the third comparison input terminal to generate the first comparing signal.

In certain embodiments, the light sensor further includes a third transistor. A first terminal of the third transistor is connected to the first comparison input terminal. A second terminal of the third transistor is grounded. A control terminal of the third transistor is connected to the output terminal of the first comparator.

In certain embodiments, the light sensor further includes a delay circuit connected between the control terminal of the third transistor and the output terminal of the first comparator.

In certain embodiments, the light sensor further includes a current mirror connected to the photoelectric component and the first capacitor.

In certain embodiments, the light sensor further includes a second comparator having a fourth comparison input terminal and a fifth comparison input terminal, which are respectively connected to a second capacitor and the output terminal of the error amplifier. An output terminal of the second comparator is connected to the counter circuit. The second capacitor is connected to the photoelectric component. The second comparator is configured to compare a voltage of the second capacitor with a second modulated voltage of the fifth comparison input terminal to output a second comparing signal.

In certain embodiments, the second comparator further includes a sixth comparison input terminal connected to the reference voltage source. The second comparator is configured to compares the voltage of the second capacitor with a lowest one of the second modulated voltage of the fifth comparison input terminal and a reference voltage of the sixth comparison input terminal to output the second comparing signal.

In certain embodiments, the light sensor further includes an analog multiplexer connected between a current mirror and the first capacitor and between the current mirror and the second capacitor. The current mirror is connected to the photoelectric component.

In certain embodiments, the light sensor further includes a logic circuit having two input terminals respectively connected to the output terminal of the first comparator and the output terminal of the second comparator. One output terminal of the logic circuit is connected to the counter circuit.

In certain embodiments, the light sensor further includes a delay circuit connected between another terminal of the logic circuit and a control terminal of a fourth transistor. A first terminal of the fourth transistor is connected to the fourth comparison input terminal, and a second terminal of the fourth transistor is grounded.

Therefore, the present disclosure provides the light sensor with high linearity, which can effectively improve the issue concerning the number of pulse waves counted by the counter circuit of the conventional light sensor being incorrect, which is caused by the propagation delay time of the comparator and the discharging pull-low delay time required for the voltage of the capacitor to discharge from the peak value to the valley value. Therefore, when the light sensor with high linearity of the present disclosure is applied to an electronic device, a distance between the electronic device and a detected object can be precisely determined according the correct number of the pulse waves.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
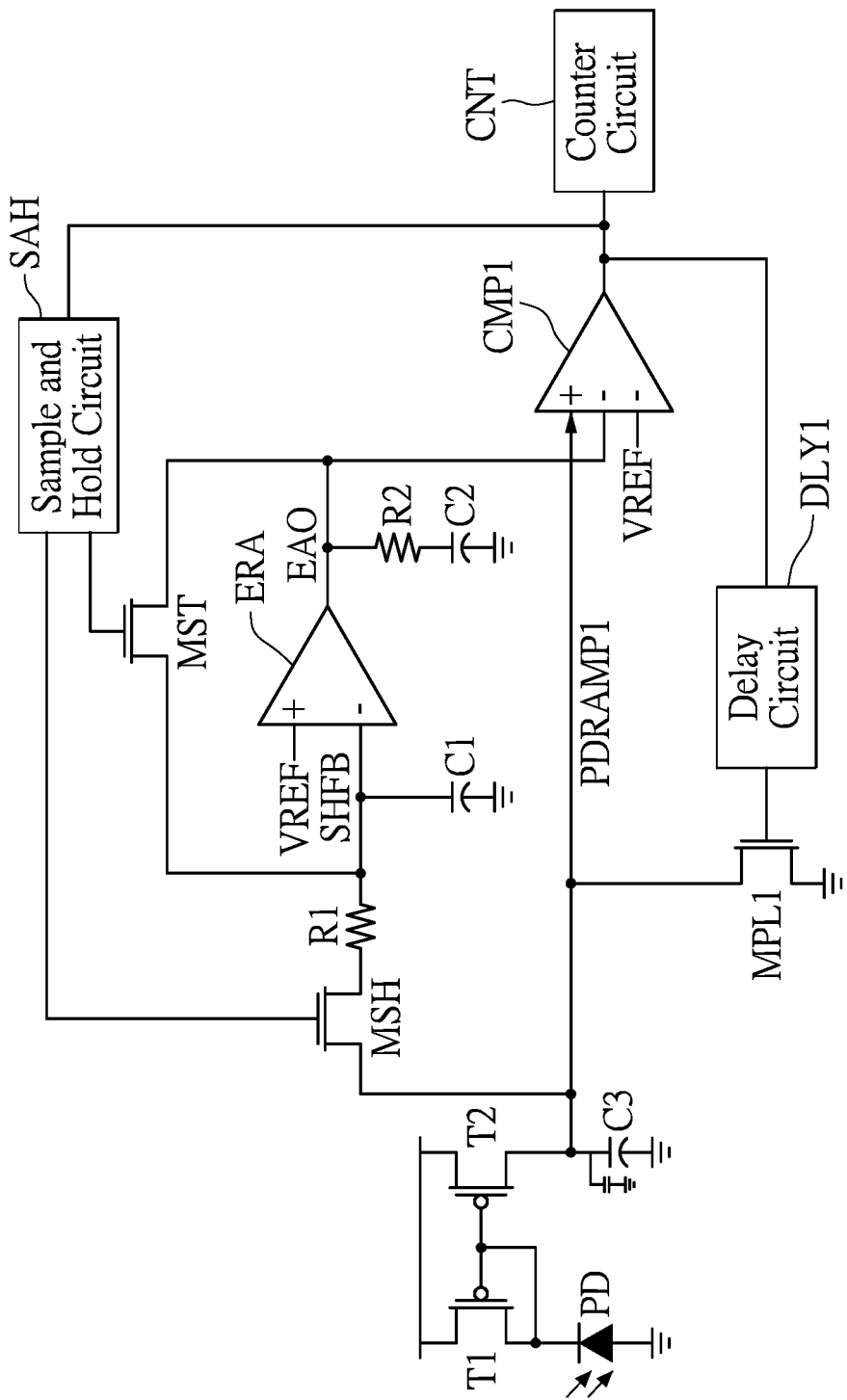
FIG. 1 is a circuit layout diagram of a light sensor with high linearity according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
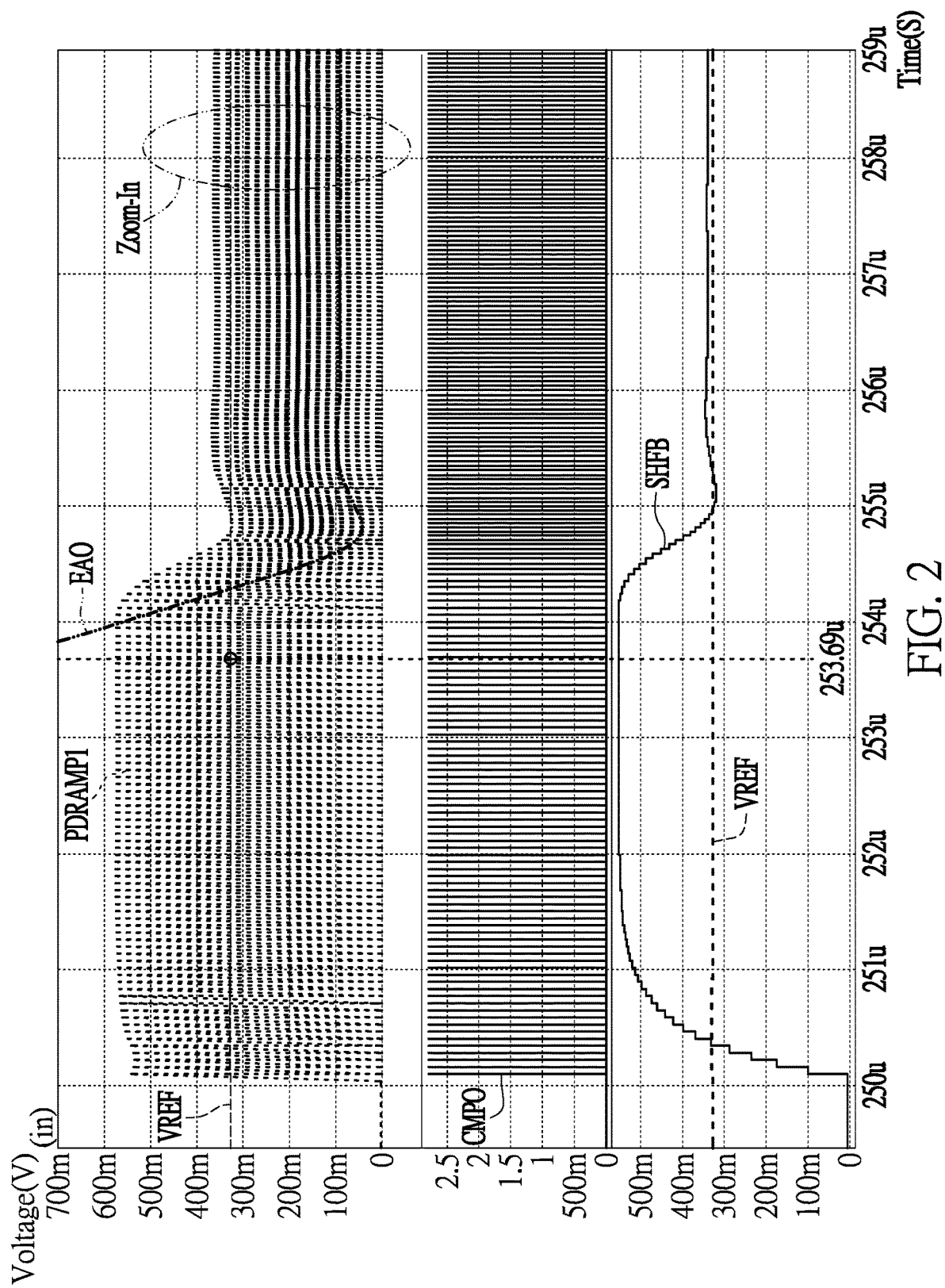
FIG. 2 is a first waveform diagram of signals of the light sensor with high linearity according to the first embodiment of the present disclosure.
Figure 3:
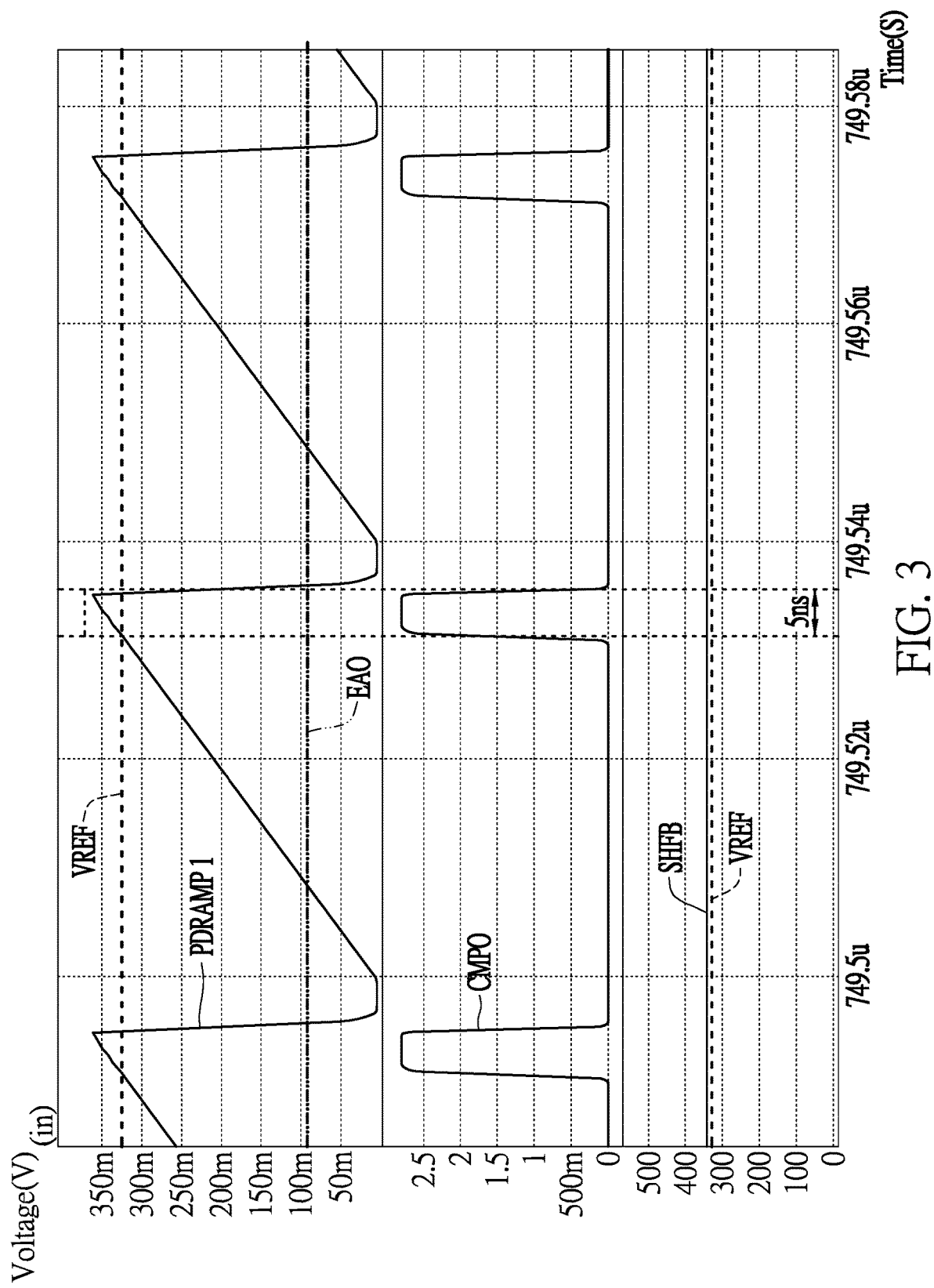
FIG. 3 is a second waveform diagram of signals of the light sensor with high linearity according to the first embodiment of the present disclosure.

Reference is made to FIGS. 1 to 3, wherein FIG. 1 is a circuit layout diagram of a light sensor with high linearity according to a first embodiment of the present disclosure; FIGS. 2 and 3 are waveform diagrams of signals of the light sensor with high linearity according to the first embodiment of the present disclosure. FIG. 3 is a partially enlarged schematic diagram of the waveforms of signals including a voltage signal circled by a dotted circle Zoom-In of FIG. 2.

As shown in FIG. 1, in the embodiment, the light sensor with high linearity includes a photoelectric component PD, an error amplifier ERA, a first comparator CMP1, a sample and hold circuit SAH, and a counter circuit CNT.

The photoelectric component PD converts light energy illuminating through the photoelectric component PD into a photocurrent. The photoelectric component PD is connected to a first sensing transistor T1 of a current mirror. A second sensing transistor T2 of the current mirror is connected to the first sensing transistor T1 and a first capacitor C3. The current mirror amplifies the photocurrent of the photoelectric component PD by a factor of N. The amplified photocurrent flows to the first capacitor C3, wherein N is any suitable value.

The error amplifier ERA has a first amplification input terminal and a second amplification input terminal. The first amplification input terminal such as a non-inverting terminal of the error amplifier ERA is connected to a reference voltage source and receives a reference voltage VREF from the reference voltage source. The second amplification input terminal such as an inverting terminal of the error amplifier ERA is connected to a first terminal of a first transistor MSH through a resistor R1 and is grounded through a capacitor C1.

An output terminal of the error amplifier ERA is grounded through a resistor R2 and a capacitor C2 and connected to a second terminal of a second transistor MST. A first terminal of the second transistor MST is connected to the second amplification input terminal of the error amplifier ERA through the resistor R1. A second terminal of the first transistor MSH is connected to the first capacitor C3. The error amplifier ERA amplifies a difference between the reference voltage VREF and a voltage SHFB of the capacitor C1 by a gain to output an error amplified signal EAO.

The first comparator CMP1 has a first comparison input terminal, a second comparison input terminal and a third comparison input terminal. The first comparison input terminal such as a non-inverting terminal of the first comparator CMP1 is connected to the first capacitor C3. The second comparison input terminal such as an inverting terminal of the first comparator CMP1 is connected to the output terminal of the error amplifier ERA. The third comparison input terminal such as an inverting terminal of the first comparator CMP1 is connected to the reference voltage source.

When an ambient light intensity is low, the photocurrent generated by the photoelectric component PD is small, the error amplified signal EAO outputted by the error amplifier ERA is higher than the reference voltage VREF received by the first comparator CMP1. Under this condition, the first comparator CMP1 compares a voltage of a first comparison input PDRAMP1 of the first capacitor C3 with the reference voltage VREF to generate a first comparing signal CMPO.

The voltage of the first comparison input PDRAMP1 gradually increases during a process of charging the first capacitor C3 by the photocurrent generated by the photoelectric component PD. A propagation delay time is required for the first comparator CMP1 to compare the voltage of the first comparison input PDRAMP1 with the reference voltage VREF. When the photocurrent is smaller, a ratio of the propagation delay time of the first comparator CMP1 to one period of the first comparison input PDRAMP1 is smaller, and the number of pulse waves counted by the counter circuit CNT is not greatly affected.

However, it is worth noting that, as shown in FIG. 2, the higher the ambient light intensity is, the larger the photocurrent generated by the photoelectric component PD, the steeper a slope of a waveform of the first comparison input PDRAMP1 of the first capacitor C3, and the larger the ratio of the propagation delay time of the first comparator CMP1 to one period of the first comparison input PDRAMP1 is. Therefore, the number of pulse waves of the first comparing signal CMPO counted by the counter circuit CNT is seriously affected by the linearity of the first comparison input PDRAMP1 of the first comparator CMP1, and results in that the number of pulse waves is far lower than the correct number.

In order to solve the above-mentioned problems in the related art, in the embodiment, when the photocurrent generated by the photoelectric component PD is large enough for the first comparator CMP1 to determine that the voltage of the first comparison input PDRAMP1 is higher than the reference voltage VREF, the first comparator CMP1 outputs the first comparing signal CMPO at a high level. The sample and hold circuit SAH is connected to an output terminal of the first comparator CMP1, a control terminal of the first transistor MSH and a control terminal of the second transistor MST. The first comparator CMP1 outputs the first comparing signal CMPO to the counter circuit CNT and the sample and hold circuit SAH. The sample and hold circuit SAH samples and holds the first comparison input PDRAMP1 from the first comparator CMP1 by the first transistor MSH. The counter circuit CNT performs counting according to the first comparing signal CMPO at a high level. That is, the counter circuit CNT performs counting the number of pulse waves of the first comparing signal CMPO.

After the first comparator CMP1 outputs the first comparing signal CMPO to the counter circuit CNT, the sample and hold circuit SAH outputs a pulse signal according to the first comparing signal CMPO at the high level. The first transistor MSH and the second transistor MST are controlled to sample the peak value of the first comparison input PDRAMP1 for the error amplifier ERA to output a first modulated voltage EAO. The voltage of the error amplified signal EAO received by the first comparator CMP1 is modulated to be higher or lower than the reference voltage VREF by the error amplifier ERA.

When a first modulated voltage of the error amplified signal EAO received by the first comparator CMP1 is lower than the reference voltage VREF, the first comparator CMP1 compares the voltage of the first comparison input PDRAMP1 of the first capacitor C3 with the first modulated voltage of the error amplified signal EAO to generate the first comparing signal CMPO. As a result, the voltage of the first comparison input PDRAMP1 is pulled-low earlier to compensate the propagation delay time of the first comparator CMP1, and make the sample and hold voltage SHFB equal to the reference voltage VREF. Therefore, the linearity of the first comparison input PDRAMP1 is improved, thereby improving correctness of the number of pulse waves counted by the counter circuit CNT, as shown in FIG. 3.

In the embodiment, the light sensor with high linearity further includes a delay circuit DLY1 and a third transistor MPL1. The delay circuit DLY1 is connected between a control terminal of the third transistor MPL1 and the output terminal of the first comparator CMP1. A first terminal of the third transistor MPL1 is connected to the first comparison input terminal of the first comparator CMP1. A second terminal of the third transistor MPL1 is grounded. After the counter circuit CNT performs counting, the delay circuit DLY1 turns on the third transistor MPL1 such that the voltage of the first comparison input terminal of the first comparator CMP1 is discharged to zero, according to the first comparing signal CMPO of the first comparator CMP1.

As described above, a conventional light sensor has the propagation delay time, resulting in a difference between the number of pulse waves counted and the correct number, but this problem is solved in the first embodiment. When a peak value of each of waveforms of the first comparison input PDRAMP1 shown in FIG. 3 is charged to be equal to or higher than the reference voltage VREF, the first comparator CMP1 outputs the first comparing signal CMPO at the high level. After that, a pull-low delay time is required for pulling low each of the waveforms of the first comparison input PDRAMP1 to a starting point. That is, the peak value of each of the waveforms of the first comparison input PDRAMP1 is discharged to a valley value. When the photocurrent generated by the photoelectric component PD charges the first capacitor C3 again, the valley value gradually is charged to the peak value again. As a result, the waveforms of the first comparison input PDRAMP1 have the same peak values. However, this pull-low delay time also affects the correctness of the number of pulse waves counted. To solve this problem, light sensors with higher linearity are provided in the following second and third embodiments.

Figure 4:
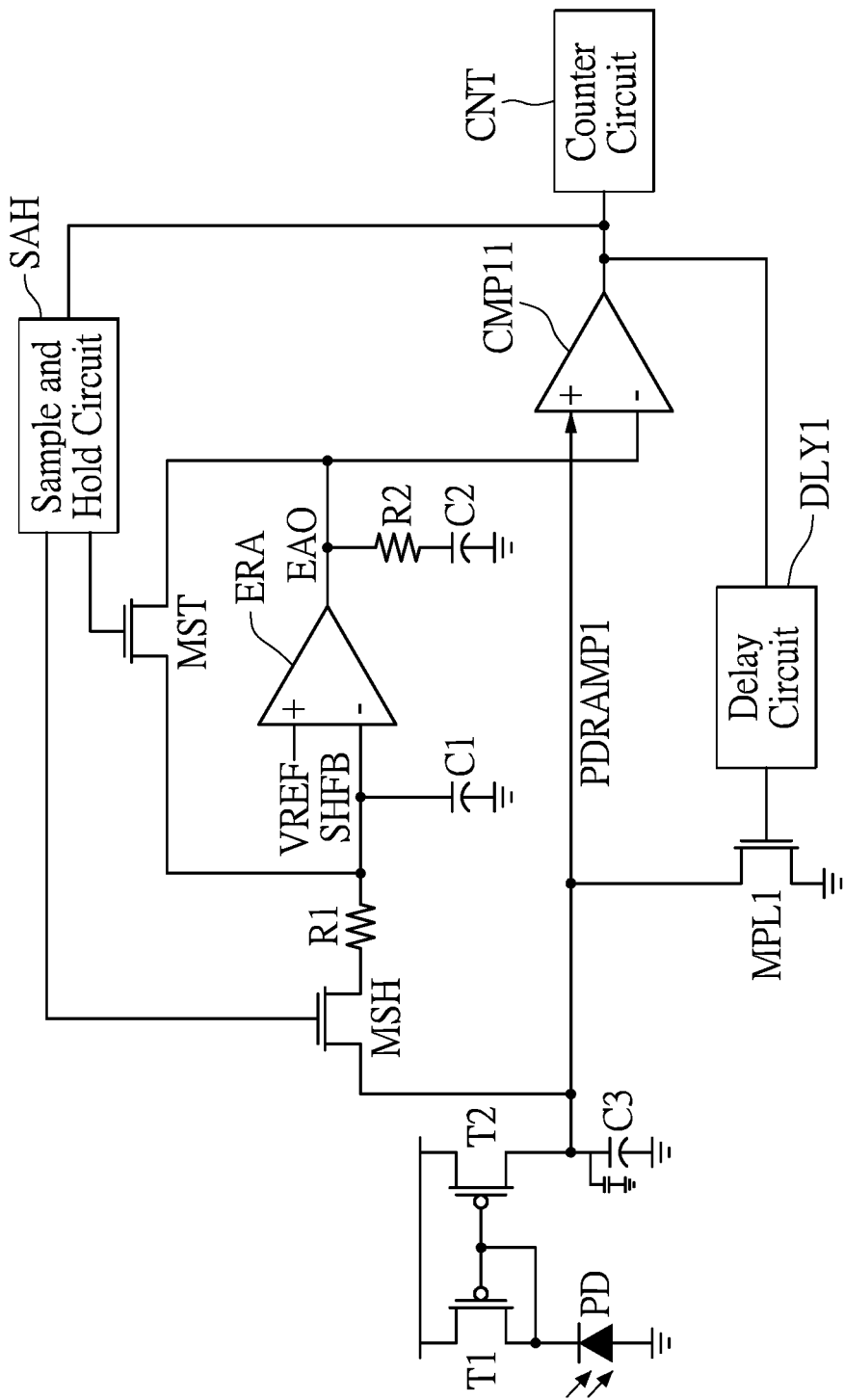
FIG. 4 is a circuit layout diagram of a light sensor with high linearity according to a second embodiment of the present disclosure.

Reference is made to FIG. 4, which is a circuit layout diagram of a light sensor with high linearity according to a second embodiment of the present disclosure. The same descriptions of the light sensors of the first and second embodiments are not repeated here. A difference between the light sensors in the first and second embodiments is that, the light sensor shown in FIG. 1 uses two inverting input terminals (the second comparison input terminal and the third comparison input terminal), but the light sensor shown in FIG. 4 only uses one inverting input terminal (a second comparison input terminal).

A first comparison input terminal such as a non-inverting input terminal of the first comparator CMP11 is connected to the first capacitor C3. The second comparison input terminal such as an inverting input terminal of the comparator CMP11 is connected to the output terminal of the error amplifier ERA.

The first comparator CMP11 is configured to compare a voltage of the first capacitor C3 with the first modulated voltage of the second comparison input terminal as the inverting input terminal of the comparator CMP11 to generate the first comparing signal to the counter circuit CNT. The counter circuit CNT performs counting according to the first comparing signal at a high level. That is, the counter circuit CNT performs counting the number of pulse waves of the first comparing signal.

A stabilization time required for the light sensor with high linearity in the first embodiment is shorter than that of the second embodiment. However, only one inverting input terminal is used in the second embodiment, thereby saving circuit costs of the light sensor with high linearity, in comparison with the first embodiment.

Figure 5:
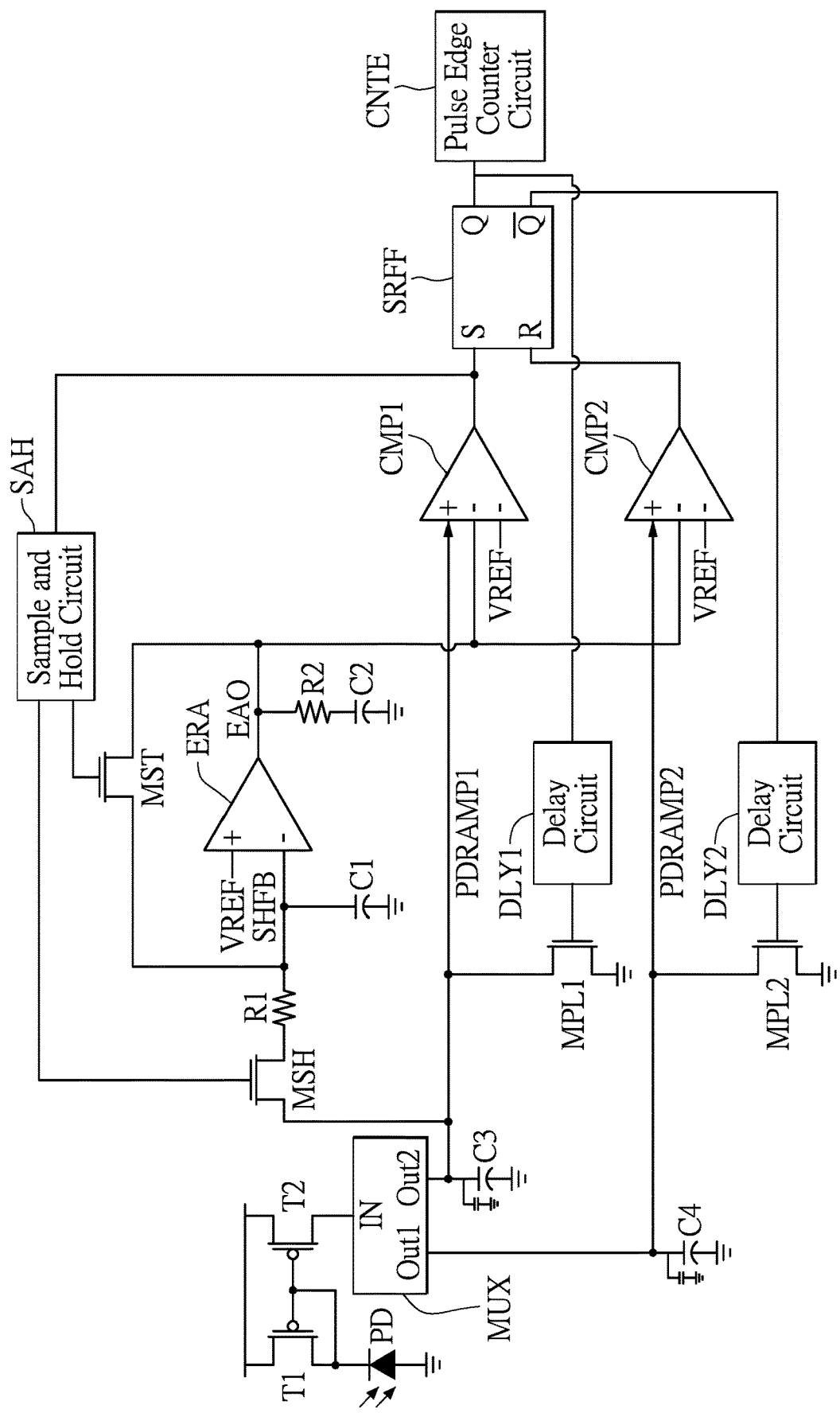
FIG. 5 is a circuit layout diagram of a light sensor with high linearity according to a third embodiment of the present disclosure.
Figure 6:
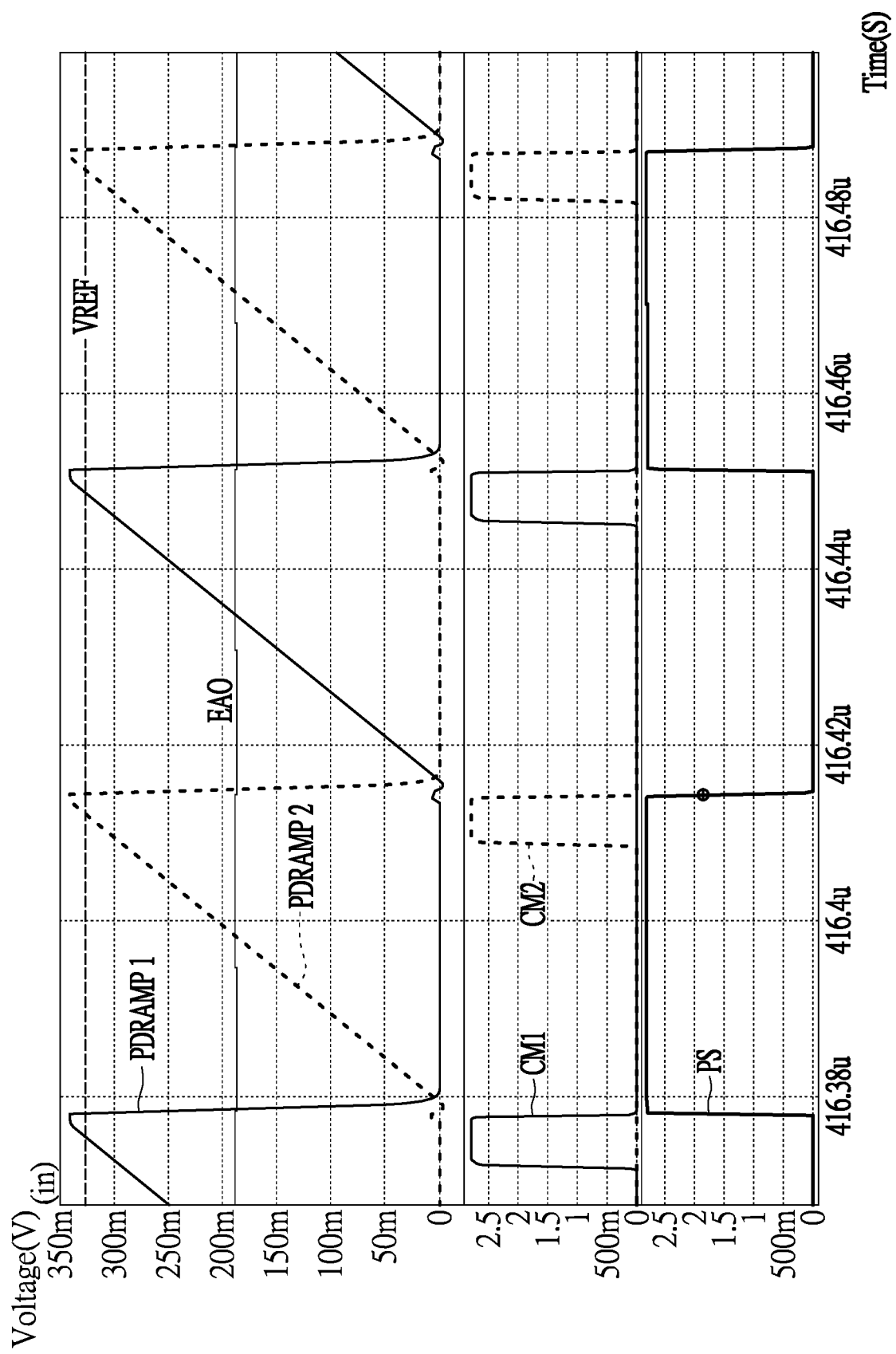
FIG. 6 is a waveform diagram of signals of the light sensor with high linearity according to the third embodiment of the present disclosure.
Figure 7:
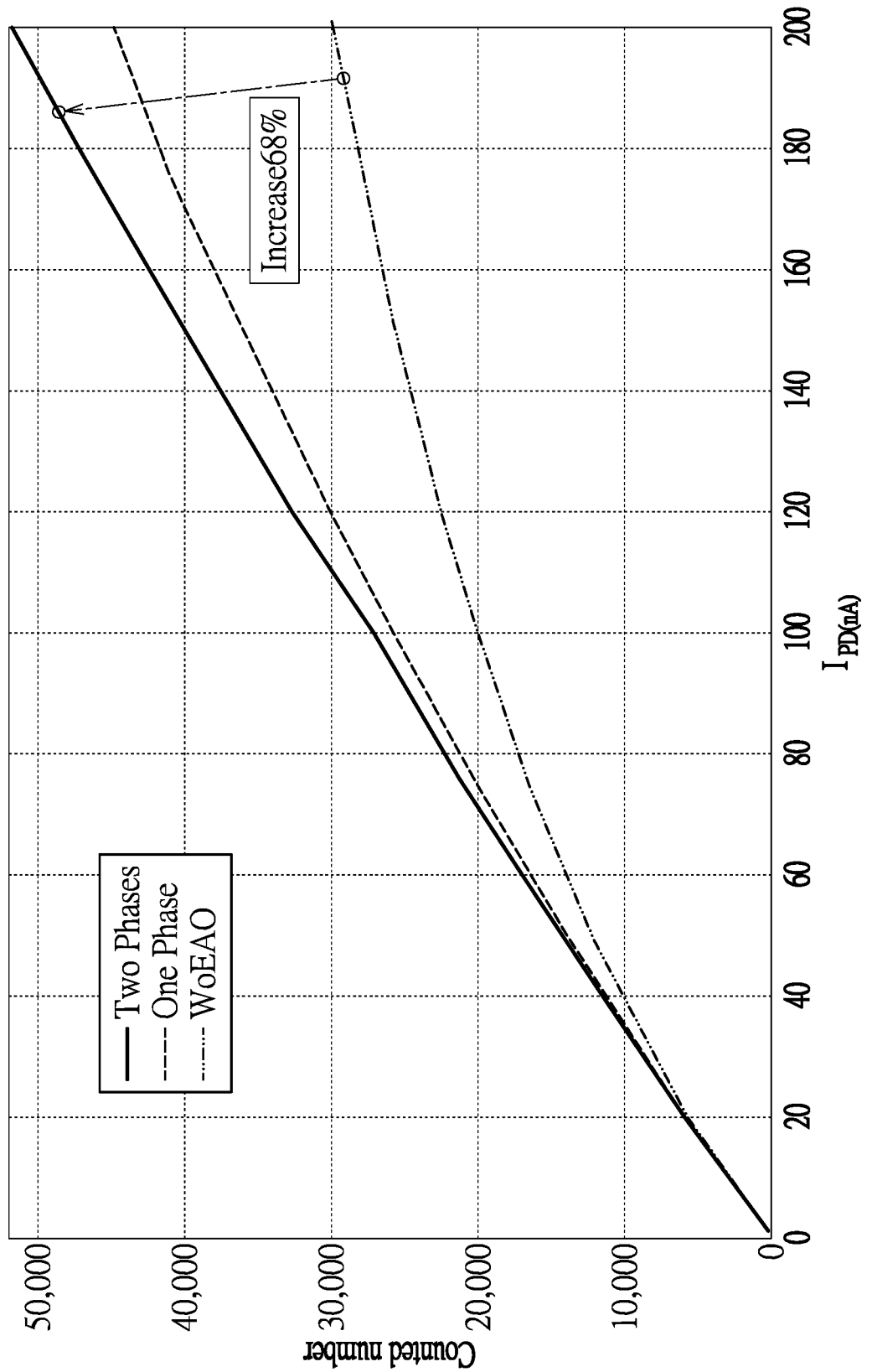
FIG. 7 is a curve diagram of the number of the pulse waves counted by the light sensor with high linearity versus a photocurrent according to the third embodiment of the present disclosure.

Reference is made to FIGS. 5 to 7, wherein FIG. 5 is a circuit layout diagram of a light sensor with high linearity according to a third embodiment of the present disclosure, FIG. 6 is a waveform diagram of signals of the light sensor with high linearity according to the third embodiment of the present disclosure, and FIG. 7 is a curve diagram of the number of the pulse waves counted by the light sensor with high linearity versus a photocurrent according to the third embodiment of the present disclosure. The same descriptions of the second embodiment as the first embodiment are not repeated here.

In the embodiment, the light sensor with high linearity further includes a logic circuit SPFF, a second comparator CMP2, a delay circuit DLY2 and a fourth transistor MPL2. For example, the logic circuit SRFF is an SR flip-flop or other suitable logic circuit component, but the present disclosure is not limited thereto.

A first input terminal S of the logic circuit SRFF is connected to the output terminal of the first comparator CMP1. A second input terminal R of the logic circuit SRFF is connected to an output terminal of the second comparator CMP2. One output terminal Q of the logic circuit SRFF is connected to a pulse edge counter circuit CNTE and the delay circuit DLY1. The pulse edge counter circuit CNTE is a counter circuit, which is different from the counter circuit CNT. The delay circuit DLY1 is connected to the control terminal of the third transistor MPL1. The first terminal of the third transistor MPL1 is connected to the first comparison input terminal of the first comparator CMP1. The second terminal of the third transistor MPL1 is grounded.

The second comparator CMP2 has a fourth comparison input terminal, a fifth comparison input terminal and a sixth comparison input terminal. The fourth comparison input terminal such as the non-inverting input terminal of the second comparator CMP2 is connected to a second capacitor C4. The fifth comparison input terminal such as an inverting input terminal of the second comparator CMP2 is connected to the output terminal of the error amplifier ERA. The sixth comparison input terminal such as an inverting input terminal of the second comparator CMP2 is connected to the reference voltage source.

The delay circuit DLY2 is connected between another output terminal Q of the logic circuit SRFF and a control terminal of the fourth transistor MPL2. A first terminal of the fourth transistor MPL2 is connected to the fourth comparison input terminal of the second comparator CMP2. A second terminal of the fourth transistor MPL2 is grounded.

It should be noted that, the second comparator CMP2, the delay circuit DLY2, the fourth transistor MPL2 and the second capacitor C4 operate alternately with the first comparator CMP1, the delay circuit DLY1, the third transistor MPL1 and the first capacitor C3. After the voltage of the first comparison input PDRAMP1 shown in FIG. 6 drops from the peak value to the valley value, the first comparator CMP1, the delay circuit DLY1, the third transistor MPL1 and the first capacitor C3 stop operating. At this time, the second comparator CMP2, the delay circuit DLY2, the fourth transistor MPL2 and the second capacitor C4 start to operate.

When the voltage of the first comparison input PDRAMP1 of the first capacitor C3 drops from the peak value to the valley value, the photocurrent of the photoelectric component PD is amplified by N times by the current mirror, wherein N is any suitable value. The amplified photocurrent is allowed to flow to the second capacitor C4 by an analog multiplexer MUX to charge the second capacitor C4. As a result, during a duty cycle of a pulse signal PS shown in FIG. 6, the second comparison input PDRAMP2 gradually increases from the valley value to be equal to or higher than the reference voltage VREF.

The analog multiplexer MUX is connected between the current mirror and the first capacitor C3 and between the current mirror and the second capacitor C4. In detail, the current mirror includes the first sensing transistor T1 and the second sensing transistor T2. A first terminal of the first sensing transistor T1 and a first terminal of the second sensing transistor T2 are connected to an input voltage source (not shown in Figures). A second terminal and a control terminal of the first sensing transistor T1 is connected to the photoelectric component PD and a control terminal of the second sensing transistor T2. A second terminal of the second sensing transistor T2 is connected to an input terminal IN of the analog multiplexer MUX. A first output terminal Out1 of the analog multiplexer MUX is connected to the second capacitor C4. A second output terminal Out2 of the analog multiplexer MUX is connected to the first capacitor C3.

The second comparator CMP2 compares a voltage of the second comparison input PDRAMP2 of the second capacitor C4 with a lowest one of a second modulated voltage of the fifth comparison input terminal of the second comparator CMP2 and the reference voltage VREF of the sixth comparison input terminal of the second comparator CMP2 to output a second comparing signal to a second input terminal R of the logic circuit SRFF. The logic circuit SRFF outputs a transition edge signal to the pulse edge counter circuit CNTE according to the second comparing signal CM2. The pulse edge counter circuit CNTE performs counting according to the transition edge signal at high or low levels transition.

After the voltage of the second comparison input PDRAMP2 shown in FIG. 6 drops from the peak value to the valley value, the second comparator CMP2, the delay circuit DLY2, the fourth transistor MPL2 and the second capacitor C4 which are included in a second group circuit stop operating. At this time, the first comparator CMP1, the delay circuit DLY1 and the third transistor MPL1 which are included in a first group circuit starts to operate.

The first comparator CMP1 compares the voltage of the first comparison input PDRAMP1 of the first capacitor C3 with a lowest one of the second modulated voltage of the second comparison input terminal of the first comparator CMP1 and the reference voltage VREF of the third comparison input terminal of the first comparator CMP1 to output the first comparing signal CM1 to a first input terminal S of the logic circuit SRFF. The logic circuit SRFF outputs a logic signal to the pulse edge counter circuit CNTE according to the first comparing signal CM1. The pulse edge counter circuit CNTE performs counting according to the-transition edge signal at high or low levels transition.

The first group circuit is alternately used with the second group circuit. As a result, when one of the first comparison input PDRAMP1 and the second comparison input PDRAMP2 falls to the valley value, the other of them is successively generated without equivalently waiting for a discharging pull-low delay time during which the peak value is discharged to the valley value. Therefore, the number of pulse waves counted by the pulse edge counter circuit CNTE is correct without being affected by any delay time.

As shown in FIG. 7, a horizontal axis IPD represents photocurrents of photoelectric components, and a vertical axis represents the number of pulse waves counted by pulse edge counter circuits of light sensors. A curve WoEAO represents a curve of the number of pulse waves counted by the conventional light sensor verses the photocurrent of the photoelectric component of the conventional light sensor. A curve of one phase represents a curve of the number of pulse waves counted by the counter circuit CNT of the light sensor with high linearity in the first embodiment versus the photocurrent of the photoelectric component PD. A curve of two phases represents a curve of the number of pulse waves counted by the pulse edge counter circuit CNTE of the light sensor with high linearity in the third embodiment versus the photocurrent of the photoelectric component PD. It is apparent that the light sensor with high linearity in the third embodiment correctly performs counting the number of pulse waves, which is increased by 68% linearity in comparison with that of the conventional light sensor as shown in FIG. 7. Therefore, the linearity of the curve of the photocurrent versus the number of pulse waves counted is significantly improved in the third embodiment.

In summary, the present disclosure provides the light sensor with high linearity. The number of pulse waves counted by the counter circuit of the conventional light sensor is not correct, which is caused by the propagation delay time of the comparator and the discharging pull-low delay time required for the voltage of the capacitor to discharge from the peak value to the valley value, is effectively improved by the present disclosure. Therefore, when the light sensor with high linearity of the present disclosure is applied to an electronic device, a distance between the electronic device and a detected object can be precisely determined according the correct number of the pulse waves.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light sensor with high linearity, comprising:
    a photoelectric component connected to a first capacitor and configured to convert light energy passing through the photoelectric component into a photocurrent to the first capacitor;
    an error amplifier has a first amplification input terminal and a second amplification input terminal, which are respectively connected to a reference voltage source and a first terminal of a first transistor, wherein a first terminal of a second transistor is connected to the second amplification input terminal, a second terminal of the first transistor is connected to the first capacitor, and an output terminal of the error amplifier is connected to a second terminal of the second transistor;
    a first comparator having a first comparison input terminal and a second comparison input terminal, which are respectively connected to the first capacitor and the output terminal of the error amplifier, wherein the first comparator is configured to compare a voltage of the first capacitor with a first modulated voltage of the second comparison input terminal to generate a first comparing signal;
    a sample and hold circuit connected to a control terminal of the first transistor, a control terminal of the second transistor and an output terminal of the first comparator, and configured to control the first transistor and the second transistor according to the first comparing signal; and
    a counter circuit connected to the output terminal of the first comparator and configured to count according to the first comparing signal.

2. The light sensor according to claim 1, wherein the first comparator further includes a third comparison input terminal connected to the reference voltage source, and the first comparator is configured to compare the voltage of the first capacitor with a lowest one of the first modulated voltage of the second comparison input terminal and a reference voltage of the third comparison input terminal to generate the first comparing signal.

3. The light sensor according to claim 1, further comprising:
    a third transistor, wherein a first terminal of the third transistor is connected to the first comparison input terminal, a second terminal of the third transistor is grounded, and a control terminal of the third transistor is connected to the output terminal of the first comparator.

4. The light sensor according to claim 3, further comprising:
    a delay circuit connected between the control terminal of the third transistor and the output terminal of the first comparator.

5. The light sensor according to claim 1, further comprising:
    a current mirror connected to the photoelectric component and the first capacitor.

6. The light sensor according to claim 1, further comprising:
    a second comparator having a fourth comparison input terminal and a fifth comparison input terminal, which are respectively connected to a second capacitor and the output terminal of the error amplifier;
    wherein an output terminal of the second comparator is connected to the counter circuit, the second capacitor is connected to the photoelectric component, and the second comparator is configured to compare a voltage of the second capacitor with a second modulated voltage of the fifth comparison input terminal to output a second comparing signal.

7. The light sensor according to claim 6, wherein the second comparator further includes a sixth comparison input terminal connected to the reference voltage source, and the second comparator is configured to compare the voltage of the second capacitor with a lowest one of the second modulated voltage of the fifth comparison input terminal and a reference voltage of the sixth comparison input terminal to output the second comparing signal.

8. The light sensor according to claim 6, further comprising:
    an analog multiplexer connected between a current mirror and the first capacitor and between the current mirror and the second capacitor, the current mirror being connected to the photoelectric component.

9. The light sensor according to claim 6, further comprising:
   a logic circuit having two input terminals respectively connected to the output terminal of the first comparator and the output terminal of the second comparator, one output terminal of the logic circuit being connected to the counter circuit.

10. The light sensor according to claim 9, further comprising:
   a delay circuit connected between another terminal of the logic circuit and a control terminal of a fourth transistor, wherein a first terminal of the fourth transistor is connected to the fourth comparison input terminal, and a second terminal of the fourth transistor is grounded.

* * * * *